(12) United States Patent
Imai

(10) Patent No.: US 6,371,443 B1
(45) Date of Patent: Apr. 16, 2002

(54) SOCKET FOR LIQUID MATERIAL OR THE LIKE TRANSFERRING CONNECTOR

(75) Inventor: Hiroshi Imai, Saitama (JP)

(73) Assignee: Surpass Industry Co., Ltd., Saitama (JP)

(*) Notice: Subject to any disclaimer, the term of this patent is extended or adjusted under 35 U.S.C. 154(b) by 0 days.

(21) Appl. No.: 09/684,911

(22) Filed: Oct. 10, 2000

(51) Int. Cl.⁷ .............................. F16K 51/00; E03B 1/00
(52) U.S. Cl. ........................ 251/149.6; 251/149.1; 137/614.04
(58) Field of Search ................ 251/149.1, 149.6; 137/614.04

(56) References Cited

U.S. PATENT DOCUMENTS

| | | | |
|---|---|---|---|
| 4,290,440 A | * 9/1981 | Sturgis | 137/45 |
| 4,700,744 A | * 10/1987 | Rutter et al. | 137/614.04 |
| 4,936,544 A | * 6/1990 | Bartholomew | 251/149.6 |
| 5,191,914 A | * 3/1993 | Gonzalez | 137/614.03 |
| 5,222,520 A | * 6/1993 | Anderson et al. | 137/614 |
| 5,301,723 A | * 4/1994 | Goode | 141/82 |
| 5,676,346 A | * 10/1997 | Leinsing | 251/149.1 |
| 5,816,298 A | * 10/1998 | Stricklin et al. | 141/346 |
| 5,971,019 A | * 10/1999 | Imai | 137/614.04 |

\* cited by examiner

Primary Examiner—Philippe Derakshani
Assistant Examiner—D. Austin Bonderer
(74) Attorney, Agent, or Firm—Browdy and Neimark, P.L.L.C.

(57) ABSTRACT

To provide a socket for a liquid material or the like transferring connector, easy to manufacture, capable of reliably preventing liquid material or the like from a bellows portion constituting a valve system from leaking out over a long term, and comparatively easily performing operations of attaching or detaching a socket to or from a plug.

A socket to be joined to a plug disposed on a container to transfer liquid material or the like within the container elsewhere, in which the socket includes a sleeve, an inner cylinder to be inserted into the sleeve, and a valve system to be disposed within the inner cylinder, and wherein the valve system has a sliding cylinder having a cylindrical bellows integrally molded with another portion at its intermediate portion.

8 Claims, 5 Drawing Sheets

(A)

(B)

SOCKET FOR LIQUID MATERIAL OR THE LIKE TRANSFERRING CONNECTOR

BACKGROUND OF THE INVENTION

1. Field of the Invention

The present invention relates to a socket for a liquid material or like transferring connector, and more particularly to a socket to be mounted on a hose side in a connector for connecting a container containing liquid material or gaseous material such as petroleum products, industrial chemicals, paint and medical goods to a hose, through which the liquid material or the like within the container is supplied.

2. Description of the Prior Art

As the socket for a liquid material or the like transferring connector, there is known, for example, a socket disclosed in Japanese Utility Model Laid-Open No. 62-110688 (FIG. 6). It is a socket in which a sliding valve body 32 is movably housed within a socket 31 in which a plug 37 is fitted, and there is disposed a bellows 34 between the sliding valve body 32 and a wall surface portion 33 of a liquid passage. This bellows 34 is used to bias the sliding valve body 32 in a direction to press it against a valve seat 36 formed in a flange shape at the tip end of a valve push body 35 to be disposed inside the sliding valve body 32, and its end portions are fixed to the sliding valve body 32 and the wall surface portion 33 in an airtight/watertight state respectively.

In this case, on joining the plug 37 to the socket 31, the socket 31 is pressed down on the plug 37 side by grasping the socket 31, and on removing, the socket 31 is pulled up by grasping it.

As described above, in a conventional socket for a connector, the bellows 34 is fixed to the sliding valve body 32 and the wall surface portion 33 in an airtight/watertight state, whereby the liquid material or the like which flows within the sliding valve body 32 is prevented from leaking out. However, an operation of fixing the bellows 34 in such a sealable state is not simple, but there is also a fear that the sealed state of fixed portions may be damaged by frequent expansion and contraction operations of the bellows 34. In addition, operations of attaching or detaching the socket 31 to or from the plug 37 require a comparatively large force, but any devices to facilitate the operations have not been made in the conventional connector.

BRIEF SUMMARY OF THE INVENTION

Object of the Invention

The present invention has been achieved in order to solve such problems in the conventional technique, and is aimed to provide a socket for a liquid material or the like transferring connector, easy to manufacture, capable of reliably preventing liquid material or the like from the bellows portion constituting the valve system from leaking out over a long term, and comparatively easily performing the operations of attaching or detaching the socket to or from the plug.

Summary of the Invention

According to the present invention, the above described problems have been solved by a socket for a liquid material or the like transferring connector, which is a socket to be joined to a plug disposed on a container to transfer liquid material or the like within the container elsewhere, in which the socket includes a sleeve, an inner cylinder to be inserted into the sleeve, and a valve system to be disposed within the inner cylinder, and wherein the valve system has a sliding cylinder having a cylindrical bellows integrally molded with another portion at its intermediate portion.

Furthermore, according to the present invention, the above described problems have been solved by a socket for a liquid material or the like transferring connector, which is a socket to be joined to a plug disposed on a container to transfer liquid material or the like within the container elsewhere, in which the socket includes a sleeve, an inner cylinder to be inserted into the sleeve, and a valve system to be disposed within the inner cylinder, and wherein a finger-putting flange is provided on the upper portion of the inner cylinder.

DETAILED DESCRIPTION OF THE PREFERRED EMBODIMENTS

Figure 1:
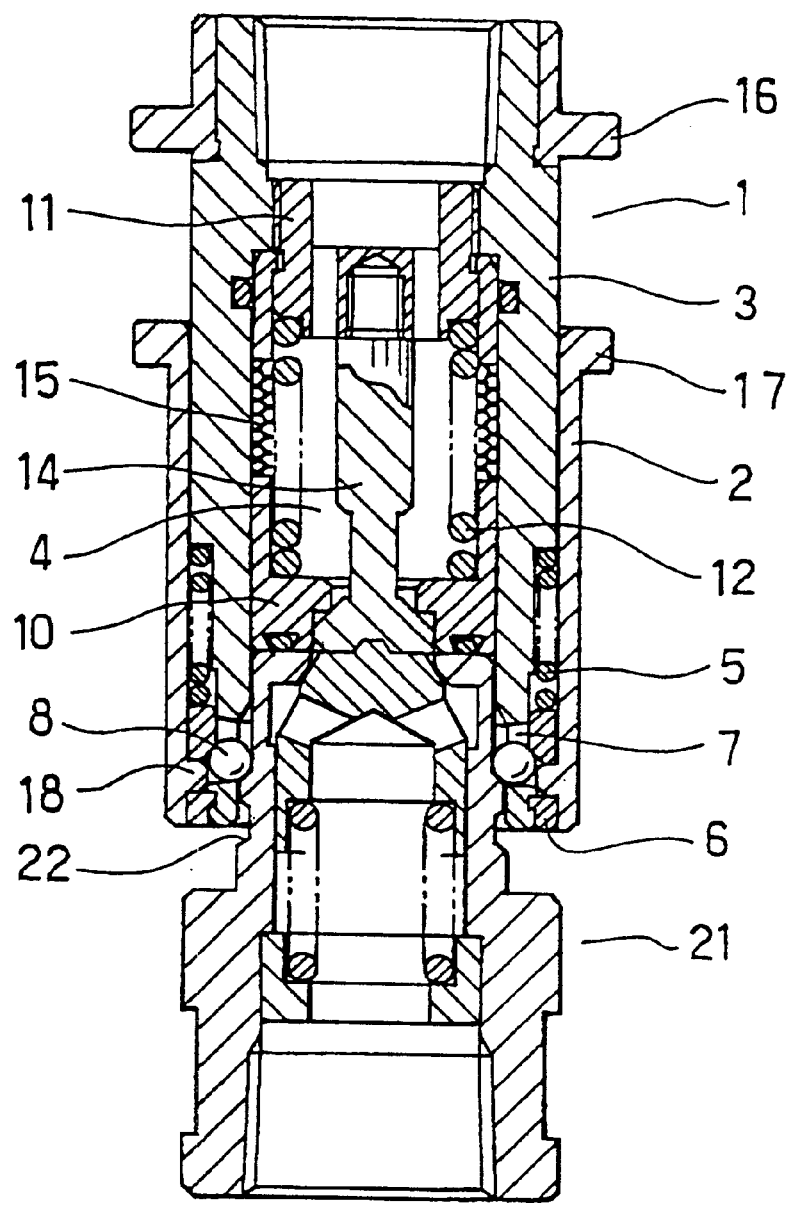
FIG. 1 is a longitudinal sectional view showing an embodiment according to the present invention.

With reference to the accompanying drawings, the description will be made of an embodiment according to the present invention. In the drawings, reference numeral 1 denotes a socket, to be disposed on a hose side, of a liquid material or the like transferring connector according to the present invention, and the connector is configured by this socket and a plug 21 to be disposed on a liquid material container side, for being fitted into the socket. The socket 1 is configured by an inner cylinder 3 to be inserted into a sleeve 2, and a valve system 4 to be disposed within the inner cylinder 3. The inner cylinder 3 is held within the sleeve 2 while the inner cylinder 3 is always being subject to an urging force in an upward direction in FIG. 1 by means of a spring 5 to be disposed on the inner peripheral surface of the sleeve 2.

Figure 2:
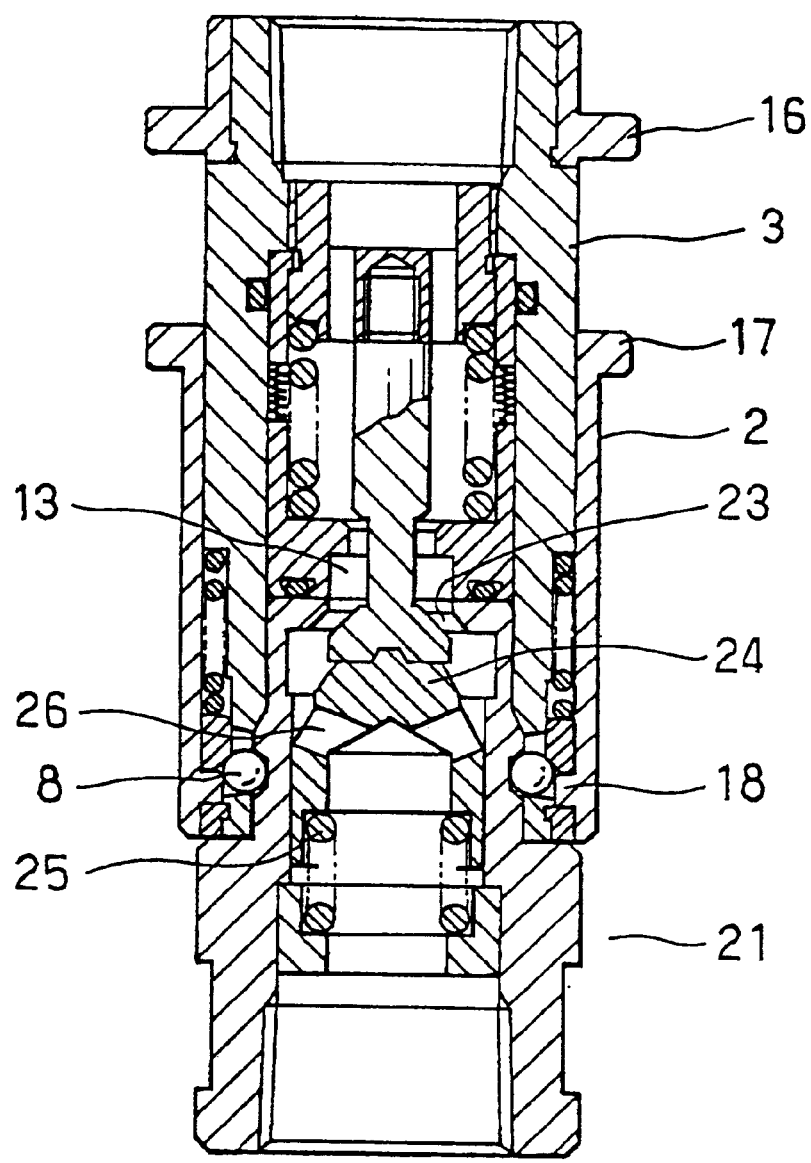
FIG. 2 is a view showing an operating state in the embodiment according to the present invention.

A stop ring 6 is fitted in a gap of a underside between the sleeve 2 and the inner cylinder 3. On the lower portion of the inner cylinder 3, there are disposed a multiplicity of tapered holes 7 side by side. The tapered hole 7 spreads outward, and a ball 8 is movably fitted therein. At that time, the ball 8 slightly protrudes inwardly from the tapered hole 7, and its portion thus protruded fits into a peripheral groove 22 formed on the head portion of the plug 21, thereby the socket 1 and the plug 21 are reliably connected to each other (FIG. 2). On the inner surface of the lower portion of the sleeve 2, there is peripherally disposed a stepped portion 18, which is in contact with the ball 8 and is used to extract the ball 8 from the peripheral groove 22 at the time of removing the socket 1 from the plug 21.

On the upper portion of the inner cylinder 3, there is disposed a finger-putting flange 16, to which fingers or a side of the hand on the little finger side is put. The flange 16 may be integrally molded with the inner cylinder 3, or may be separately molded to be fixed to the inner cylinder 3 by screwing or the like. Preferably, a finger-putting flange 17 is further disposed on the upper end portion of the sleeve 2. The flange 17 is normally integrally molded with the sleeve 2.

Figure 4:
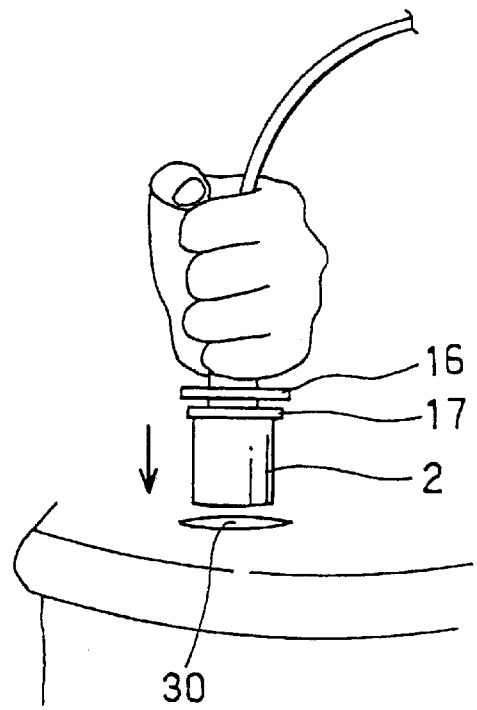
FIG. 4 is a view showing a joining operation of a socket to a plug.

On joining the socket 1 to the plug 21, the user grasps a portion above the flange 16 (FIG. 4) by putting the side of the hand on the little finger side in a grasped state to the upper surface of the flange 16. After the upper portion of the plug 21 is put into the inner cylinder 3 (in FIG. 4, the plug 21 enters a recess 30 of the container and cannot be seen) in such a state, the user urges the flange 16 straight down. The urging force at that time is effectively applied to the flange 16. This means that it becomes possible to join the socket 1 to the plug 21 with a not so much large force.

In order to confirm that the socket 1 is reliably joined to the plug 21, the flange 16 may be lifted by hand. If the socket 1 is not extracted by pulling it up, it can be confirmed that the connection is completed.

Figure 5:
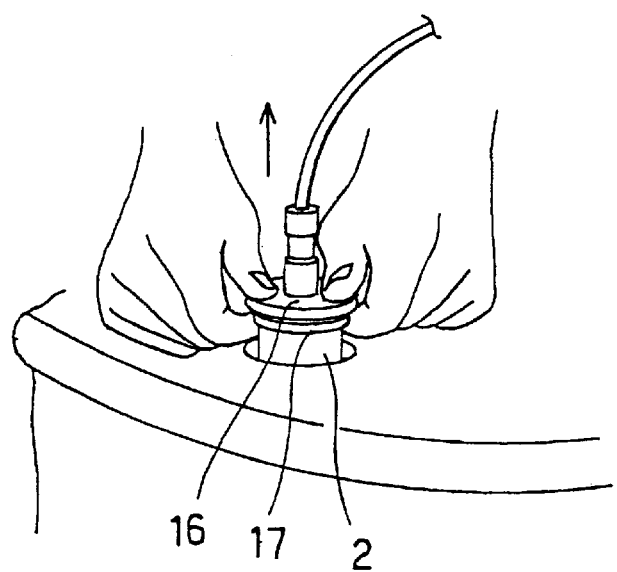
FIG. 5 is a view showing a removing operation of the socket from the plug.
Figure 6:
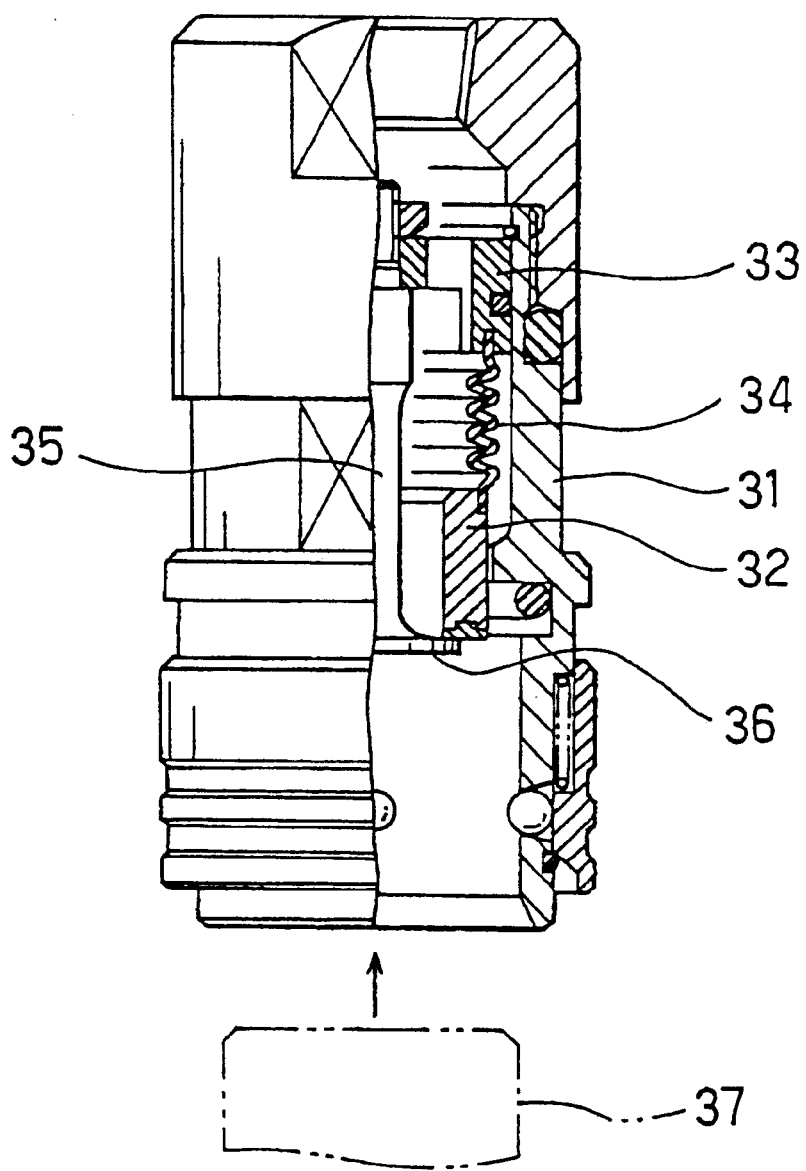
FIG. 6 is a longitudinal sectional view showing a conventional socket for a connector.

At the time of removing the socket 1 from the plug 21, the user puts his left and right thumbs to the upper surface of the flange 16 on both sides and puts the sides of his left and right forefingers on the thumb side on both sides of the underside of the flange 17 to pressurize so as to sandwich both flanges 16 and 17 between each thumb and each forefinger (FIG. 5). Then, the sleeve 2 moves upward against the spring pressure of the spring 5 so that a stepped portion 18 provided there exerts so as to push the ball 8 up to extract the ball 8 from the peripheral groove 22 of the plug 21. Thus, the jointed state between the socket 1 and the plug 21 will be released. This releasing operation can be easily performed with a small force by the provision of the flange 16 and the flange 17.

The valve system 4 is configured by the sliding cylinder 10, the stopper 11, a spring 12 disposed between both, and a valve 14 fixed to the stopper 11, for opening/closing an opening 13 in the sliding cylinder 10.

Figure 3:
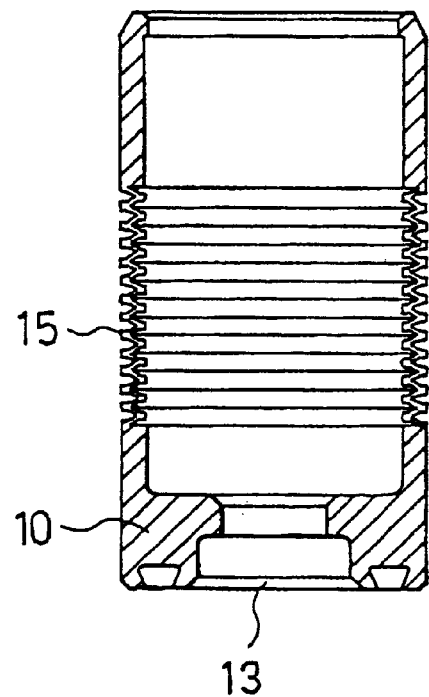
FIGS. 3A and 3B are views showing a shape of a sliding cylinder according to the embodiment of the present invention.
Figure 3:
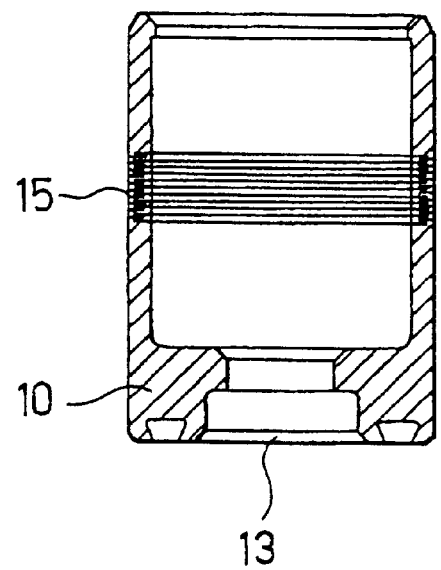

The sliding cylinder 10 is preferably made of fluoroplastic, has a cylindrical shape, and has a bellows 15 formed in the intermediate portion thereof (FIG. 3). This bellows is integrally molded with another portion, and is not any one which is separately manufactured and is made integral with the another portion. Therefore, it is not necessary to pay any special attention to securing of sealing properties between the bellows 15 and the another portion.

The spring 12 always biases the sliding cylinder 10 downward in FIG. 1 to act so as to locate the sliding cylinder 10 at the lowest position. The opening 13 of the sliding cylinder 10 is blocked up at the position by the valve 14, and is opened by the sliding cylinder 10 being urged by the plug 21 (FIG. 2).

That is, when the socket 1 is pressed down to move downward in FIG. 1, the ball 8 slidingly moves along the side of the plug 21 to fall into the peripheral groove 22 so that the socket 1 and the plug 21 unite with each other. At the time, the valve 24, which blocks up the opening 23 in the plug 21 by the valve 14, is urged against the spring pressure of the spring 25 which presses it up, whereby the opening 23 on the plug 21 side is opened.

At the time, the sliding cylinder 10 on the socket 1 side is urged by the head surface of the plug 21, and the bellows 15 portion of the sliding cylinder 10 contracts, whereby the sliding cylinder 10 moves upward (FIGS. 2 and 3B). Thereby, the valve 14 retracts from the opening 13 to open there.

Thus, liquid material or the like to be transferred through the plug 21 flows into the socket 1 side from a flow path 26 in the valve 24 through the opening 23 and the opening 13. In the present invention, since the bellows 15 is integrally molded with another portion, that is, the sliding cylinder 10 and a stopper 11, there is not any fear that the liquid material or the like flowed in will leak from the vicinity of the bellows 15.

According to the present invention, as described above since the bellows is formed by integrally molding it with another portion at the intermediate portion of the sliding cylinder, there is an effect that it is possible to reliably prevent the liquid material or the like from the bellows portion from leaking over a long term as well as saving time, effort and cost in joining the bellows and the another portion in consideration of sealing properties.

In the invention according to claims 3 to 6, there is an effect that the joining operation for the socket and the plug, and the removal operation can be performed easily and smoothly with a small force.

What is claimed is:

1. A socket for a liquid material transferring connector, which is a socket to be joined to a plug disposed on a container to transfer liquid material within said container elsewhere, comprising:

a sleeve;

an inner cylinder to be inserted into said sleeve; and a valve system to be disposed within said inner cylinder, wherein said valve system has a sliding cylinder having a cylindrical bellows integrally molded with another portion at its intermediate portion.

2. The socket for a liquid material transferring connector according to claim 1, wherein said sliding cylinder is made of fluoroplastic.

3. The socket for a liquid material transferring connector according to claim 2, wherein a finger-putting flange is provided on the upper portion of said inner cylinder.

4. The socket for a liquid material transferring connector according to claim 3, wherein a finger-putting flange is provided on the upper end portion of said sleeve.

5. The socket for a liquid material transferring connector according to claim 1, wherein a finger-putting flange is provided on the upper portion of said inner cylinder.

6. The socket for a liquid material transferring connector according to claim 1, wherein a finger-putting flange is provided on the upper end portion of said sleeve.

7. A socket for a liquid material transferring connector, which is a socket to be joined to a plug disposed on a container to transfer liquid material or the like within said container elsewhere, comprising:

a sleeve;

an inner cylinder to be inserted into said sleeve; and a valve system to be disposed within said inner cylinder, wherein a finger-putting flange is provided on the upper portion of said inner cylinder;

wherein said valve system has a sliding cylinder having a cylindrical bellows.

8. The socket for a liquid material transferring connector according to claim 7, wherein a finger-putting flange is provided at the upper end portion of said sleeve.

* * * * *